(12) United States Patent
Twigg et al.

(10) Patent No.: US 9,169,753 B2
(45) Date of Patent: Oct. 27, 2015

(54) DIESEL ENGINE AND A CATALYSED FILTER THEREFOR

(75) Inventors: Martyn Vincent Twigg, Cambridge (GB); Paul Richard Phillips, Herts (GB)

(73) Assignee: Johnson Matthey Public Limited Company, London (DE)

( * ) Notice: Subject to any disclaimer, the term of this patent is extended or adjusted under 35 U.S.C. 154(b) by 2377 days.

(21) Appl. No.: 10/547,834

(22) PCT Filed: Mar. 5, 2004

(86) PCT No.: PCT/GB2004/000882
§ 371 (c)(1),
(2), (4) Date: May 31, 2006

(87) PCT Pub. No.: WO2004/079167
PCT Pub. Date: Sep. 16, 2004

(65) Prior Publication Data
US 2007/0028604 A1    Feb. 8, 2007

(30) Foreign Application Priority Data

Mar. 5, 2003  (GB) .................................. 0304939.2

(51) Int. Cl.
*F01N 3/00*    (2006.01)
*F01N 3/02*    (2006.01)
*F02M 25/06*   (2006.01)
(Continued)

(52) U.S. Cl.
CPC ............ *F01N 3/035* (2013.01); *B01D 53/9472* (2013.01); *B01D 53/9495* (2013.01); *F01N 3/0222* (2013.01); *F02D 41/029* (2013.01)

(58) Field of Classification Search
CPC ..... F01N 3/035; F01N 3/0222; F02D 41/029; B01D 53/9472; B01D 53/9495
USPC ............ 60/278, 285, 286, 295, 297, 303, 311
See application file for complete search history.

(56) References Cited

U.S. PATENT DOCUMENTS

| 4,329,162 A | 5/1982 | Pitcher, Jr. |
| 4,515,758 A | 5/1985 | Domesle et al. |

(Continued)

FOREIGN PATENT DOCUMENTS

| EP | 0 056 584 A1 | 7/1982 |
| EP | 0 277 012 A1 | 8/1988 |

(Continued)

*Primary Examiner* — Jesse Bogue
*Assistant Examiner* — Diem Tran
(74) *Attorney, Agent, or Firm* — Kevin M. Carroll

(57) ABSTRACT

A diesel engine includes an exhaust system having a particulate filter made from a porous material having a mean pore diameter of from 5 µm to 40 µm, a porosity of at least 40% and a bulk volumetric heat capacity of at least 0.50 J cm$^{-3}$ K$^{-1}$ at 500° C. The filter includes a diesel oxidation catalyst (DOC) located in a first catalyst zone on the front end of the filter and at least one catalyst zone located downstream thereof, for oxidizing carbon monoxide, hydrocarbons and nitrogen monoxide. The engine includes engine management means, in use, to provide continuously or intermittently an exhaust gas having sufficient nitrogen oxides or hydrocarbon and/or an exhaust gas of sufficiently high temperature to combust particulate matter. The platinum group metal (PGM) loading in the first catalyst zone is greater than the total PGM loading in the at least one downstream catalyst zone.

22 Claims, 1 Drawing Sheet

(51) Int. Cl.
  *F01N 3/035* (2006.01)
  *B01D 53/94* (2006.01)
  *F01N 3/022* (2006.01)
  *F02D 41/02* (2006.01)

(56) References Cited

U.S. PATENT DOCUMENTS

| | | | |
|---|---|---|---|
| 4,857,089 A | 8/1989 | Kitagawa et al. | |
| 4,902,487 A | 2/1990 | Cooper et al. | |
| 5,089,237 A | 2/1992 | Schuster et al. | |
| 5,492,679 A | 2/1996 | Ament et al. | |
| 5,519,993 A | 5/1996 | Rao et al. | |
| 5,750,084 A | 5/1998 | Tsutsumi et al. | |
| 5,758,496 A | 6/1998 | Rao et al. | |
| 5,878,567 A * | 3/1999 | Adamczyk et al. | 60/274 |
| 6,375,910 B1 * | 4/2002 | Deeba et al. | 60/297 |
| 6,541,407 B2 * | 4/2003 | Beall et al. | 501/119 |
| 6,568,178 B2 * | 5/2003 | Hirota et al. | 60/297 |
| 6,877,313 B1 * | 4/2005 | Phillips et al. | 60/297 |
| 2002/0061811 A1 | 5/2002 | Merkel | |
| 2004/0074231 A1 | 4/2004 | Bruck | |
| 2007/0044458 A1 * | 3/2007 | Cheng | 60/295 |
| 2008/0053070 A1 * | 3/2008 | Hatton | 60/286 |

FOREIGN PATENT DOCUMENTS

| | | |
|---|---|---|
| EP | 0 341 832 A2 | 11/1989 |
| EP | 0 560 991 A1 | 4/1993 |
| EP | 0 736 503 A1 | 10/1996 |
| EP | 0 758 713 A1 | 2/1997 |
| EP | 0 814 242 A1 | 12/1997 |
| EP | 0 834 343 A1 | 4/1998 |
| EP | 1 057 519 A1 | 12/2000 |
| EP | 0 766 993 B1 | 3/2003 |
| EP | 1 312 776 A2 | 5/2003 |
| FR | 2 805 568 A1 | 8/2001 |
| JP | 2002-227688 | 8/2002 |
| JP | 2002-295298 | 10/2002 |
| WO | WO-99/39809 | 8/1999 |
| WO | WO-99/42760 | 9/1999 |
| WO | WO-99/55459 | 11/1999 |
| WO | WO-00/29726 | 5/2000 |
| WO | WO-00/74823 A1 | 12/2000 |
| WO | WO-01/12320 A1 | 2/2001 |
| WO | WO-01/74476 A1 | 10/2001 |
| WO | WO-01/91882 A1 | 12/2001 |
| WO | WO-02/38513 A1 | 5/2002 |
| WO | WO-02/083274-AI | 10/2002 |
| WO | WO-03/078352 A1 | 9/2003 |
| WO | WO-2004/002608 | 1/2004 |
| WO | WO-2004/011124 A1 | 2/2004 |

* cited by examiner

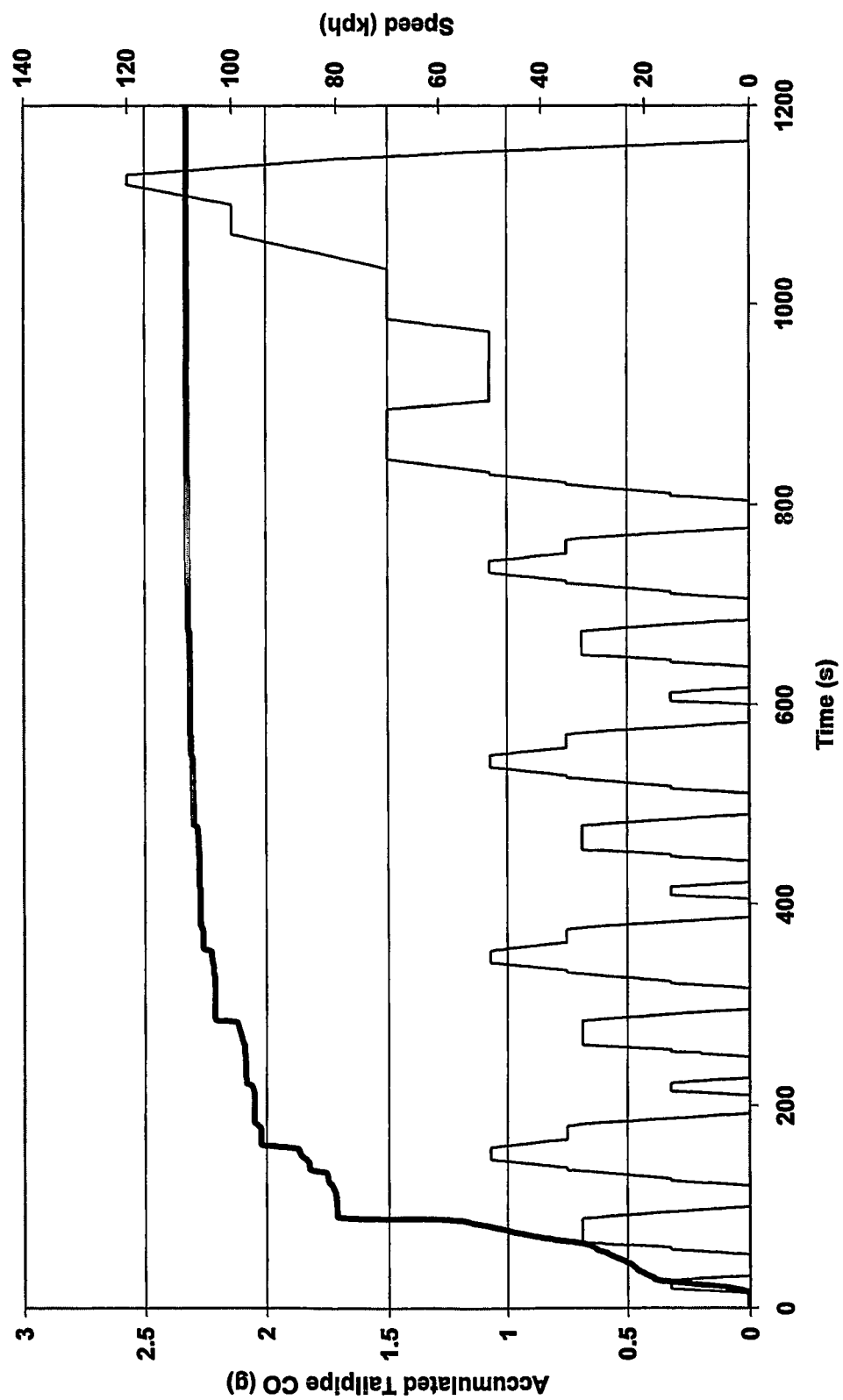

DIESEL ENGINE AND A CATALYSED FILTER THEREFOR

This application is the U.S. national phase application of PCT International Application No. PCT/GB2004/000882, filed Mar. 5, 2004, and claims priority of British Patent Application No. 0304939.2, filed Mar. 5, 2003.

FIELD OF THE INVENTION

The invention relates to a diesel engine comprising an exhaust system comprising a particulate filter. In particular, the invention concerns such an engine comprising a catalysed soot filter.

BACKGROUND OF THE INVENTION

Permitted emissions from internal combustion engines, such as diesel engines, are legislated by governments. Amongst the legislated exhaust gas species are nitrogen oxides ($NO_x$), carbon monoxide (CO), hydrocarbons (HC) and particulate matter (PM). The levels of permitted emissions of these species are being progressively reduced over the next 10 to 15 years. Original equipment manufacturers (OEMs) are seeking to meet these legislated requirements through a combination of engine design and exhaust gas aftertreatment.

In order to meet existing and future legislated requirements for diesel PM, one device proposed for exhaust gas aftertreatment is the particulate filter. By "filter" herein we mean devices that remove a solid particle from an exhaust gas and also devices that intentionally delay the progress of the particle through the exhaust system. An example of the latter group of devices is described in EP 1057519 (incorporated herein by reference).

One example of a particulate filter is a wall-flow filter in which the filter is in the form of a honeycomb. The honeycomb has an inlet end and an outlet end, and a plurality of cells extending from the inlet end to the outlet end, the cells having porous walls wherein part of the total number of cells at the inlet end are plugged, e.g. to a depth of about 5 to 20 mm, along a portion of their lengths, and the remaining part of the cells that are open at the inlet end are plugged at the outlet end along a portion of their lengths, so that a flowing exhaust gas stream passing through the cells of the honeycomb from the inlet end flows into the open cells, through the cell walls, and out of the filter through the open cells at the outlet end. A composition for plugging the cells is described in U.S. Pat. No. 4,329,162 (incorporated herein by reference). A typical arrangement is to have every other cell on a given face plugged, as in a chequered pattern.

It is known to catalyse such filters in order to lower the soot combustion temperature to facilitate regeneration of the filter passively by oxidation of PM under exhaust temperatures experienced during regular operation of the engine/vehicle, typically in the 300-400° C. range. In the absence of the catalyst, PM can be oxidized at appreciable rates at temperatures in excess of 500° C., which are rarely seen in diesel engines during real-life operation. Such catalysed filters are often called catalysed soot filters (or CSFs).

A common problem with passive filter regeneration is that driving conditions can prevent exhaust gas temperatures achieving even the lower temperatures facilitated by catalysing the filter frequently enough to reliably prevent PM from building up on the filter. Such driving conditions include extended periods of engine idling or slow urban driving and the problem is particularly acute for exhaust gas from light-duty diesel engines. One solution to this problem which has been adopted by OEMs is to use active techniques to regenerate the filter either at regular intervals or when a predetermined filter backpressure is detected in addition to passive regeneration. A typical arrangement in a light-duty diesel vehicle is to position a diesel oxidation catalyst (DOC) on a separate monolith upstream of the CSF and to regulate in-cylinder fuel combustion by various engine management techniques in order to introduce increased amounts of unburned fuel into the exhaust gas. The additional fuel is combusted on the DOC, increasing the temperature in the downstream CSF sufficiently to promote combustion of PM thereon.

EP-A-0341382 or U.S. Pat. No. 4,902,487 (both incorporated herein by reference) describes a method of treating diesel exhaust gas including PM and $NO_x$ unfiltered over an oxidation catalyst to convert NO to $NO_2$, collecting the PM on a filter downstream of the oxidation catalyst and combusting trapped PM in the $NO_2$. This technology is commercially available as Johnson Matthey's CRT®. An advantage of this process is that the combustion of PM in $NO_2$ occurs at temperatures of up to 400° C., i.e. closer to the normal operating window for diesel exhaust gases, whereas combustion of PM in oxygen occurs at 550-600° C.

Our WO 01/12320 (incorporated herein by reference) describes a reactor especially suitable for treating exhaust gases to remove pollutants including PM and comprises a wall-flow filter structure with porous walls and alternate blocked ends, wherein a washcoat carrying a catalyst coats a zone at an upstream end of open channels at an upstream end of the filter.

We have now devised a CSF for use in a passive-active filter regeneration regime that makes more efficient use of the more limited exhaust gas temperatures and variation of exhaust gas temperatures from diesel engines, especially light-duty diesel engines.

According to one aspect the invention provides a diesel engine comprising an exhaust system, which exhaust system comprising: a particulate filter made from a porous material having a mean pore diameter of from 5 µm to 40 µm, and a porosity of at least 40%, e.g. 50% to 70%, and a bulk volumetric heat capacity of at least 0.50 J cm$^{-3}$ K$^{-1}$ at 500° C., which filter comprising a diesel oxidation catalyst (DOC) located in a zone on the front end of the filter for oxidising carbon monoxide (CO), hydrocarbons (HC) and nitrogen monoxide (NO), the engine comprising engine management means, in use, to provide continuously or intermittently an exhaust gas comprising sufficient nitrogen oxides ($NO_x$) or HC and/or an exhaust gas of sufficiently high temperature to combust particulate matter (PM) in the filter.

The catalysed soot filter of the present invention combines a number of very useful functions: it collects soot from the exhaust gas; it promotes passive oxidation of the collected soot in oxygen; it promotes NO oxidation to promote the passive combustion of collected soot in $NO_2$ according to the process described in EP 0341832; and it converts CO and HC in the exhaust gas at relatively low temperatures. Additionally, by positioning the DOC on the front of the filter, active regeneration of the filter is promoted, because the exotherm from combusting additional HC contributes to heating the filter directly, i.e. there is no temperature loss between an upstream DOC and the downstream CSF. Accordingly, active regeneration is more efficient, requiring less fuel to raise the filter temperature to effect regeneration.

BRIEF DESCRIPTION OF THE DRAWINGS

FIG. 1 shows that the post light-off CO emissions are flat lined which suggests that once the CSF is up to temperature, the thermal mass of the filter substrate retains sufficient heat for conversion of CO during fluctuating exhaust gas temperatures.

DETAILED DESCRIPTION OF THE INVENTION

The choice of a relatively high bulk volumetric heat capacity filter for an active regeneration system is surprising because the bulk volumetric heat capacity determines the amount of thermal energy that can be absorbed by the filter monolith. For active regeneration, it is generally understood that a low heat capacity filter is desired because it enables rapid increase of the filter temperature and quick regeneration with minimal energy losses for heating the monolith. We have found that by locating the DOC component on the upstream end of a filter having a relatively high bulk volumetric heat capacity, heat is retained in the filter more readily, thus improving conversion of HC, CO and soot in the system.

Suitable filter monolith materials for use in the present invention have relatively low pressure drop and relatively high filtration efficiency. The skilled engineer will be aware that a trade-off exists between porosity and mechanical strength: substrates of smaller pore size and lower porosity are stronger than those of high porosity. Thermal properties, both heat capacity and thermal conductivity, decrease with increasing porosity. However, since the filters of the present invention are intended for carrying a catalyst and optionally a washcoat, e.g. of about 50 g/dm$^3$, suitable filter materials typically have a porosity of from 45-55% or even 60% and above for filters comprising $NO_x$ storage components at high washcoat loadings of up to about 100 g/dm$^3$. A desirable feature of such materials is that they have good pore interconnectivity and as few closed or "dead end" pores as possible. Suitable mean pore diameters are from 8-25 μm, such as from 15-20 μm. The porosity values expressed herein can be measured by mercury porosimetry or electron microscopy.

Typically, the filter material comprises a ceramic material, comprising at least one of silicon carbide, aluminium nitride, silicon nitride, aluminium titanate, sintered metal, alumina, cordierite, mullite, pollucite (see e.g. WO 02/38513 (incorporated herein by reference)), a thermet such as $Al_2O_3$/Fe, $Al_2O_3$/Ni or $B_4C$/Fe, or composites comprising segments of any two or more thereof.

Preferred materials for making the filter of the present invention are cordierite (magnesium aluminium silicates), silicon carbide and aluminium titanates. Suitable cordierite type materials having the approximate stoichiometry $Mg_2Al_4Si_5O_{18}$ are disclosed in WO 01/91882 (incorporated herein by reference) and WO 2004/002508 (incorporated herein by reference), although alternatives such as lithium aluminosilicate ceramics can be used provided they have the required properties. Cordierite-type materials are generally characterised by a relatively low coefficient of thermal expansion (CTE) and low elastic (E) modulus.

Aluminium titanate materials for use in the present invention can include the 60-90% iron-aluminium titanate solid solution and 10-40% mullite described in WO 2004/011124 (incorporated herein by reference); or strontium feldspar aluminium titanate disclosed in WO 03/078352 (incorporated herein by reference).

A feature of the present invention is that the bulk volumetric heat capacity is at least 0.50 J cm$^{-3}$ K$^{-1}$ at 500° C. This is for at least two reasons. Firstly, once the filter is up to temperature, it retains heat even when the exhaust gas temperature fluctuates during transient operation. For this reason we have seen good results for CO oxidation and HC oxidation during transient operation (see Example). This can be particularly useful in treating light-duty diesel exhaust gas, which is generally lower than for heavy-duty diesel engines.

Secondly, a relatively high bulk volumetric heat capacity prevents or reduces the risk of the heat from soot combustion damaging the filter and/or catalyst coating because the exothermic energy is absorbed by the filter material itself. Suitable values for bulk volumetric heat capacity are >0.67 J cm$^{-3}$ K$^{-1}$ at 500° C., but some aluminium titanate-based materials can have far higher values such as >3.0 J cm$^{-3}$ K$^{-1}$ at 500° C., such as at least 3.9 J cm$^{-3}$ K$^{-1}$ at 500° C. for the material described in WO 2004/011124.

Typically, filters for use in the present invention have a shape of a honeycomb, the honeycomb having an inlet end and an outlet end, and a plurality of cells extending from the inlet end to the outlet end, the cells having porous walls wherein part of the total number of cells at the inlet end are plugged along a portion of their lengths, and the remaining part of the cells that are open at the inlet end are plugged at the outlet end along a portion of their lengths, so that a flowing exhaust gas stream passing through the cells of the honeycomb from the inlet end flows into the open cells, through the cell walls, and out of the filter through the open cells at the outlet end.

Common cell geometries include 100/17, i.e. a configuration of 100 cells per square inch (cpsi) (31 cells cm$^{-2}$) and 0.017 inch (0.43 mm) wall thickness, 200/12 (62 cells cm$^{-2}$/0.30 mm), 200/14 (62 cells cm$^{-2}$/0.36 mm), 200/19 (62 cells cm$^{-2}$/0.48 mm) and 300/12 (93 cells cm$^{-2}$/0.30 mm). The 200/19 configuration, for example, provides a more mechanically robust filter and an increased bulk volumetric heat capacity. Accordingly, cell densities for use in the invention can be from 50 to 600 cpsi (15.5 cells cm$^{-2}$-186 cells cm$^{-2}$)

Filter monoliths having lower CTE and lower E modulus are preferred because they are less likely to crack and need replacing. Cracking can occur when the tensile stress in the filter (as a result of high thermal gradients caused by localized heat release during filter regeneration) exceeds the tensile strength of a filter. If the CTE and E are relatively high, as is the case for silicon carbide materials (CTE ~10$^{-6}$/° C.), the thermal shock tolerance can be relatively poor. A measure of thermal shock resistance is the thermal shock parameter (TSP), a ratio of mechanical strain tolerance to thermal strain imposed by temperature gradient. The higher the TSP, the better the thermal shock capability of the material. The most common solution to this problem is to limit the cross-sectional area of the filter. Filters are made up of two or more longitudinal segments bond two or more segments bonded together. In the case of silicon carbide, the bonding materials are typically based on silica-alumina fibres, silica sol, carboxymethyl cellulose or silicon carbide powder. Composite silicon-silicon carbide materials (silicon metal as the bonding agent between silicon carbide grains instead of recrystallised silicon carbide) can be used instead of, or in addition to, segmentation.

By contrast, relatively low CTE of the order of about 10$^{-7}$/° C. materials can be used in the form of a single piece i.e. unsegmented.

Suitable CTE values for materials that can be considered for use in the present invention are from −30×10$^{-7}$/° C. to +30×10$^{-7}$/° C. from 25° C. to 800° C., such as from −20× 10$^{-7}$/° C. to +10×10$^{-7}$/° C. (25-800° C.). For a cordierite material, for example, the CTE could range from 4×10$^{-7}$/° C. to 17×10$^{-7}$/° C. such as 4-13×10$^{-7}$/° C. (see WO 2004/002608 and WO 01/91882), whereas suitable aluminium titanate materials can have a CTE of from −10×10$^{-7}$/° C. to +15×10$^{-7}$/° C. (25-1000° C.), and −0.5×10$^{-7}$/° C. to 6× 10$^{-7}$/° C. (25-800° C.) (see WO 03/078352).

The relatively high bulk volumetric heat capacity filter material of WO 01/91882 is suitable in high temperature applications such as particulate filter which exhibits a low pressure drop across the length of the filter.

Alternatively, the filter material can comprise a mixture of silicon carbide and silicon nitride. In this embodiment, the particulate filter can comprise blocks of these materials cemented together.

The diesel oxidation catalyst for oxidising CO, HC and NO for use in the present invention is located in a zone on the front end of the filter. The dimensions of the zone chosen can depend on the size of the filter and can be readily optimised by the skilled engineer without undue experimentation. In one embodiment, in a filter measuring 5.66 in (144 mm) in diameter and 9.75 in (248 mm) long and having a cell density of 200 cells per square inch (cpsi) (31 cells $cm^{-2}$) and 0.019 in (0.48 mm) wall thickness, the DOC zone extends for 3 inches (7.62 cm) from the inlet end of the filter.

The DOC can comprise one or more platinum group metals (PGMs) such as platinum, palladium, rhodium or ruthenium or any combination of two or more thereof. Preferably, total or individual PGM loadings can be from 25 to 200 $g/ft^3$, suitably from 50 to 150 $g/ft^3$. The catalyst can be impregnated on the filter material itself or supported on a suitable particulate high surface area refractory oxide. Suitable particulate refractory oxide washcoat components include bulk ceria, silica, alumina, titania, zirconia and mixed oxides and composite oxides of any two or more thereof, such as silica-alumina or ceria-alumina. Where the washcoat includes bulk ceria, suitably it is in the form of a mixed or composite oxide with at least one of zirconium, lanthanum, aluminium, yttrium, praseodymium and neodymium in order to improve its thermal durability, sulfur resistance and/or other properties. In a particular embodiment, the bulk ceria is combined in a mixed or composite oxide with zirconium in a weight ratio of cerium to zirconium of from 5:95 to 95:5.

By "composite oxide" herein, we mean a largely amorphous oxide material comprising oxides of at least two elements which are not true mixed oxides consisting of at least two metals.

In order further to maximise heat use in the system, in one embodiment, an upstream end of the filter is disposed up to 1 meter, such as up to 50 cm, e.g. up to 20 cm, either upstream or downstream, from the exhaust manifold or turbo. A configuration where the particulate filter is disposed within 1 meter of the engine exhaust manifold is referred to herein as being in the "close-coupled" or "near coupled" position relative thereto. In functional terms "close coupling" with regard to the present specification can be defined as "limiting the temperature drop between the engine outlet and the filter inlet". In order to limit the temperature losses over longer coupling distances e.g. 70-100 cm, the exhaust conduit can be a double walled pipe, with or without a vacuum in the coaxial zone, lagged or similarly insulated.

In a particular embodiment, the filter comprises at least one zone comprising a washcoat comprising a particulate refractory oxide along at least a part of its length.

In one embodiment, the filter comprises at least two zones each comprising the same or a different washcoat. For example, at least one zone can be located on an upstream side of the filter and at least one zone on a downstream side of the filter.

In a further embodiment, at least one washcoat zone comprises a longitudinal gradient of washcoat thickness, e.g. in a wall-flow filter, an upstream end of an open channel has a higher washcoat loading than downstream thereof. Such a gradient can be a gradated i.e. a stepwise gradient or a sloping gradient. Either arrangement can be produced according to techniques well known in the art. For example, the stepwise gradient can be made by dipping in a suitable washcoat to a required depth and drying to generate a filter having a first washcoat layer. The coated piece is then re-dipped to a lesser depth so that only part of the first layer is covered and then drying the resulting piece. The re-dipping process can be repeated a desired number of times e.g. to result in a desired series of "stepped" washcoat gradient loadings.

A filter including a sloping gradient can be made by introducing a suitable filter e.g. a wall-flow filter into an apparatus for automatically coating a monolith substrate such as described in our WO 99/47260 (incorporated herein by reference). More specifically, a monolithic support coating apparatus, comprising means for dosing a pre-determined quantity of a liquid component such quantity being such that it is substantially wholly retained within the intended support, liquid component containment means locatable on the top of a support to receive said quantity of liquid component, and vacuum pressure means acting on the bottom of the support and capable of withdrawing the entirety of the liquid component from the containment means into at least a portion of the support, without recycle.

An advantage of gradated washcoat embodiments is that by adjusting the washcoat loading in the longitudinal direction it is possible to alter the pressure drop along the filter wall in the longitudinal direction, i.e. the washcoat sets up a permeability gradient. For example, in the embodiment featuring a higher washcoat loading at the inlet end than downstream thereof, more soot is directed towards the downstream end of the inlet channel. This is advantageous because it reduces or prevents the risk of localised soot combustion towards the upstream end of the inlet channel from undesirably causing accelerated thermal ageing of the DOC and any other catalyst present, thus maintaining activity of the or each catalyst.

As the skilled engineer is aware, a filter should not be washcoated to the extent that the backpressure in the system in use is too high for the filter to perform its function of collecting an adequate quantity of soot before the filter should be regenerated. Acceptable backpressures, in use, are up to 0.8 bar at a flow rate of 600 Kg $hr^{-1}$ at 600° C. Washcoat loading can be adjusted as appropriate by the skilled person to allow for sufficient soot loading before this threshold is reached, triggering an active regeneration.

According to a further embodiment, at least one washcoat zone comprises a lateral gradient of washcoat loading. Such an arrangement can be obtained also using the apparatus of WO 99/47260. For example, as described therein, the base of the containment means may have differing permeability to give easier flow, and hence greater coating deposits, in regions or the base itself acts as a profiled containment means, e.g. by machining a honeycomb monolith, so that certain regions contain greater quantities of liquid component which are transferred directly to corresponding parts of the support located below the base.

Suitable particulate refractory oxide washcoat components include any mentioned above in connection with the DOC.

Suitably, washcoat particulate size is selected so that it does not block a desired range of pore diameters for filtering diesel PM. Particulate size can be adjusted by known techniques, such as milling.

The DOC and any other catalyst present can be applied to the filter by impregnating the filter material itself e.g. by dipping a filter in a suitable precious metal salt, drying and then calcining the resulting piece. The filter can include one or more zones having this feature, and of different catalyst loadings as desired. In one embodiment, the filter comprises at least two catalyst zones each comprising the same or a different catalyst, optionally with at least one catalyst zone on a downstream side of the filter.

According to one embodiment, at least one catalyst zone comprises a longitudinal gradient of catalyst loading which can be a stepwise, i.e. gradated, or sloping gradient. This arrangement is particularly advantageous in that we have found that the filter temperatures in the close-coupled arrangement can be 700° C. at the inlet, but as high as 1100° C. at the outlet. At these temperatures any catalyst toward the downstream end is likely to become less active in time through sintering etc. Furthermore, the downstream end of the inlet channel can fill up with ash over the lifetime of the vehicle so that soot is unlikely to have good contact with catalyst in this portion of the channel. Accordingly, the use of a gradient allows for thrifting of precious metals, such as platinum, to prevent the metal from being located on the filter where it may become redundant or deactivated.

The at least one catalyst zone may cover the same part of the filter as a washcoat zone, although it need not i.e. catalyst and washcoat loadings can be independent of one another. Typically, the washcoated filter is dipped and impregnated with a suitable metal salt and the resulting material dried and calcined. However, in one embodiment a catalyst can be pre-fixed to a particulate support material e.g. by incipient wetness impregnation with a suitable salt followed by drying, and then calcination. The catalyst-loaded particulate can then be formulated in a suitable washcoat composition and applied to a filter as explained above.

Of course, a similar embodiment to the washcoat embodiment described above wherein at least one catalyst zone comprises a lateral gradient of catalyst loading is also possible.

One way of avoiding catalyst redundancy in a downstream section of the filter is to dispose a catalyst on the downstream end of the outlet channels of the filter. Such an arrangement is desirable to treat CO generated from a forced or active regeneration of the filter. The catalyst can be formulated for thermal durability if it is to be used in this position.

In addition, or alternatively, at least one catalyst for use in zones downstream of the DOC can be a soot combustion catalyst comprising a molten salt, suitably an alkali metal salt, alkaline earth metal salt or a lanthanum salt of vanadium, tungsten or molybdenum or vanadium pentoxide. Alkaline earth metal components include magnesium, calcium, strontium and barium or mixtures of any two or more thereof. Copper- and silver-based catalysts can also be used, such as silver or copper vanadates.

The at least one catalyst can be supported on any of the particulate refractory oxide materials mentioned above and then either by impregnating a filter that has already been washcoated with a suitable metal salt, or by fixing the catalyst to the particulate support prior to washcoating the filter e.g. by impregnating, drying, and then calcining the impregnated support. The latter method enables the skilled engineer to select which particulate refractory oxides should carry the catalytic metal in a washcoat system comprising two or more different particulate refractory oxides. For example, where the skilled engineer desires to put platinum on alumina, but not on a mixed or composite oxide of bulk ceria and zirconia, this can be done by preparing the platinum supported washcoat component separately and then blending the two components in the desired proportions in the washcoat.

PGM loadings in the additional catalysts for use in the invention can be from 0.10 to 200 g/ft$^3$, suitably from 0.25 to 120 g/ft$^3$ and optionally from 1.00 to 50 g/ft$^3$. Where the filter comprises two or more catalyst zones, each zone can comprise a different catalyst loading. Suitable catalysts include PGMs such as platinum, palladium, rhodium and ruthenium, particularly platinum. In one particular embodiment, the DOC comprises Pt on an alumina-based support at 100 g/ft$^3$ loading and the remainder of the filter comprises a gradated catalyst arrangement comprising a plurality of zones wherein the most downstream zone of the inlet channels comprising 10 g/ft$^3$ Pt/alumina-based support for reasons discussed above.

In a further embodiment, the filter includes a catalyst for absorbing $NO_2$ when the exhaust gas is lean. Catalysts for absorbing $NO_2$ from exhaust gas are known e.g. from EP-A-0560991 (incorporated herein by reference) and include compounds of at least one of an alkali metal, e.g. potassium or caesium, an alkaline-earth metal such as barium, strontium, calcium or magnesium, typically barium, or a rare-earth metal, e.g. lanthanum or caesium, or mixtures thereof. Typically present as oxides, in use, the compounds may take the form of hydroxides, nitrates or carbonates.

Such catalysts can include at least one PGM, typically Pt, for oxidising NO in the exhaust gas to $NO_2$ when the exhaust gas composition is lean and rhodium for reducing $NO_x$ to $N_2$ when the exhaust gas composition is rich. The DOC can perform the NO oxidation function, so that additional Pt is unnecessary.

Whilst it is possible to use the natural fluctuations of exhaust gas temperature and exhaust gas composition throughout a driving cycle to regenerate the absorbent, generally an engine management means is used to provide intermittent enrichment of the exhaust gas and/or higher temperature exhaust gas relative to normal running conditions for this purpose. In one embodiment, the intermittent provision of sufficient $NO_x$ in the exhaust gas to combust PM in the filter is provided by an adjustment in the rate of exhaust gas recirculation (EGR).

The engine can be any diesel engine. It can include, for example, direct injection e.g. using common rail injection, and/or a turbo.

Light-duty diesel engines are defined in European legislation by European Directive 70/220/EEC, as amended by 93/59/EC and 98/69/EC. In the USA passenger vehicles, light light-duty trucks (LLDT), below 6000 lbs gross vehicle weight rating (GVWR) and heavy light-duty trucks (HLDT), above 6000 lbs are included in the light-duty diesel category. The exhaust gas temperatures emitted from light-duty diesel engines are generally lower than those of heavy-duty diesel engines (as defined by the relevant legislation).

In one embodiment, the engine can comprise two arrays of cylinders, e.g. arranged in a 'V' configuration, each array comprising an exhaust manifold comprising a diesel particulate filter for use in the invention, or a filter downstream of a junction of the two manifolds.

Desirably, the engine according to any preceding claim run on fuel of less than 50 ppm sulfur w/w.

EXAMPLES

In order that the invention may be more fully understood, the following Example is provided by way of illustration only with reference to the accompanying drawing in which FIG. 1 shows the an accumulated tailpipe CO emissions from a light-duty diesel vehicle fitted with a catalysed soot filter according to the invention.

Example 1

A commercially available, 2.2 liter 16 valve, turbocharged, direct injection, common rail diesel vehicle, certified for European Stage 3 legislative requirements, was fitted with a catalysed soot filter (CSF) according to the invention, 8 inches (203 mm) downstream from the turbocharger outlet. The ceramic filter substrate was 5.66 in (144 mm) diameter and 9.75 in (248 mm) long with a cell density of 200 cells per square inch (cpsi) (31 cells cm$^{-2}$) and 0.019 in (0.48 mm) wall thickness having a bulk volumetric heat capacity of 820 kJ Kg$^{-1}$ K$^{-1}$. Pt was loaded on the filter which had been pre-coated with an alumina-based particulate support in a two zone gradated arrangement wherein approximately 80% of the Pt loading (in g/ft$^3$) of the preferred range according to the invention was located on the front of the filter to form a DOC and the remaining 20% was homogeneously applied throughout the remainder of the filter.

The vehicle, after fuelling with 50 ppm sulphur containing diesel fuel, was placed on a mileage accumulation dynamometer and run over the AMA mileage accumulation cycle. This cycle, which is a legislatively recognised catalyst durability cycle, comprises 11 laps of a 6 km course at an average speed of 46 km hr$^{-1}$, a top speed of 113 kmh$^{-1}$ and a cycle time of approximately 88 minutes.

Catalyst data was logged constantly at 0.1 Hz. Temperatures were monitored at the inlet to the catalyst and 1 in (25 mm) into the filter from the rear face. Back pressure was also monitored. During passive regeneration phases of the mileage accumulation the CSF inlet temperature ranged from approximately 250° C. to a maximum of about 350° C. The tailpipe NO$_x$ emissions suggest that there is sufficient NO$_x$ available for partial passive regeneration of the CSF at temperatures observed in the system. In addition, the vehicle's production supplied calibration regenerated the CSF at regular pre-determined intervals. During periods of active regeneration, the rear CSF temperatures increased to from 700-1000° C.

A total of 80,000 km of AMA ageing was completed, with Euro III emissions and particulate data collected at 0, 5, 10, 20, 40, 60 and 80,000 km (Table 1). It can be seen that tailpipe emissions remained stable over the entire 80,000 km durability.

TABLE 1

Cumulative Tailpipe Bag Emissions Using Euro III Test Cycle at Intervals Over 80,000 km Road Mileage Accumulation

| Accumulated Distance (km) | HC (g km$^{-1}$) | CO (g km$^{-1}$) | PM (g km$^{-1}$) |
|---|---|---|---|
| 0 | 0.053 | 0.147 | 0.003 |
| 5,000 | 0.024 | 0.121 | 0.001 |
| 10,000 | 0.021 | 0.109 | 0.001 |
| 20,000 | 0.015 | 0.093 | 0.001 |
| 40,000 | 0.017 | 0.108 | 0.005 |
| 60,000 | 0.015 | 0.113 | 0.005 |
| 80,000 | 0.016 | 0.114 | 0.006 |

Example 2

An identical specification vehicle was fitted with an identical specification CSF mounted in the same exhaust position was driven for 20,000 km road mileage. The 20,000 km was accumulated using a mixture of urban and motorway driving. Temperature and back pressure were logged at 0.1 Hz with CSF filter regeneration temperatures peaking between 650-700° C. Emission data was collected after 0, 5, 10 and 20,000 km mileage accumulation (Table 2), with similar tailpipe emissions to those collected during AMA mileage accumulation.

TABLE 2

Cumulative Tailpipe Bag Emissions Using Euro III Test Cycle at Intervals Over 20,000 km Road Mileage Accumulation

| Accumulated Distance (km) | HC (g km$^{-1}$) | CO (g km$^{-1}$) | PM (g km$^{-1}$) |
|---|---|---|---|
| 0 | 0.040 | 0.172 | 0.002 |
| 5,000 | 0.047 | 0.226 | 0.003 |
| 10,000 | 0.036 | 0.202 | 0.004 |
| 20,000 | 0.044 | 0.253 | 0.007 |

The invention claimed is:

1. A diesel engine system comprising:
    an exhaust system comprising: a particulate filter made from a porous material having a mean pore diameter of from 5 µm to 40 µm, a porosity of at least 40% and a bulk volumetric heat capacity of at least 0.50 J cm$^{-3}$ K$^{-1}$ at 500° C., which filter comprising a plurality of catalyst zones having a total quantity of at least one platinum group metal (PGM) comprising a first catalyst zone located on the front end of the filter and at least one catalyst zone located downstream thereof, wherein the first catalyst zone comprises a diesel oxidation catalyst (DOC) comprising a first quantity of the total quantity of the at least one PGM located in a zone on the front end of the filter for oxidising carbon monoxide (CO), hydrocarbons (HC) and nitrogen monoxide (NO), and wherein the at least one downstream catalyst zone comprises a second quantity of the total quantity of the at least one PGM and the at least one downstream catalyst zone is located throughout the remainder of the particulate filter following the first catalyst zone, wherein the first quantity is greater than the second quantity; and
    an engine management means, in use, to provide continuously or intermittently:
    (a) an exhaust gas comprising sufficient nitrogen oxides (NO$_x$) or HC and an exhaust gas of sufficiently high temperature to combust particulate matter (PM) in the filter; or
    (b) an exhaust gas comprising sufficient NO$_x$ or HC to combust particulate matter (PM) in the filter; or
    (c) an exhaust gas of sufficiently high temperature to combust particulate matter (PM) in the filter; and
    wherein the first catalyst zone and the at least one downstream catalyst zone are arranged such that the exhaust gas flows through the first catalyst zone having the first quantity and then through the at least one downstream zone having the second quantity.

2. The diesel engine system according to claim 1, wherein the upstream end of the filter is disposed up to 1 meter from the exhaust manifold or turbo.

3. The diesel engine system according to claim 1, wherein the filter has a shape of a honeycomb, the honeycomb having an inlet end and an outlet end, and a plurality of cells extending from the inlet end to the outlet end, the cells having porous walls wherein part of the total number of cells at the inlet end are plugged along a portion of their lengths, and the remaining part of the cells that are open at the inlet end are plugged at the outlet end along a portion of their lengths, so that a flowing exhaust gas stream passing through the cells of the honeycomb from the inlet end flows into the open cells, through the cell walls, and out of the filter through the open cells at the outlet end.

4. The diesel engine system according to claim 1, wherein the filter material comprises a ceramic material.

5. The diesel engine system according to claim 1, wherein the filter material is selected from the group consisting of silicon carbide, aluminium nitride, silicon nitride, aluminium titanate, alumina, sintered metal, cordierite, mullite, pollucite, a thermet, a mixture of silicon carbide and silicon nitride, and mixtures and composites of any two or more thereof.

6. The diesel engine system according to claim 1, wherein first catalyst zone and the at least one downstream catalyst zone comprise the same or a different catalyst.

7. The diesel engine system according to claim 1, wherein the at least one downstream catalyst zone comprises a longitudinal gradient of catalyst loading.

8. The diesel engine system according to claim 1, wherein the at least one downstream catalyst zone comprises a lateral gradient of catalyst loading.

9. The diesel engine system according to claim 1, wherein the PGM in the at least one downstream catalyst zone is supported by the filter material per se.

10. The diesel engine system according to claim 1, wherein the engine management means provide intermittent provision of sufficient $NO_x$ in the exhaust gas to combust PM in the filter by adjusting the rate of exhaust gas recirculation (EGR).

11. A diesel engine system according to claim 1, wherein the first catalyst zone and the at least one downstream catalyst zone comprise a plurality of zones collectively arranged in a longitudinal stepwise gradient of catalyst loading.

12. The diesel engine system according to claim 1, wherein the filter comprises at least one washcoat zone comprising a particulate refractory oxide along at least a part of a length of the filter, wherein each zone comprises the same or a different washcoat from any other zone.

13. The diesel engine system according to claim 12, wherein the at least one washcoat zone comprises a longitudinal gradient of washcoat thickness.

14. The diesel engine system according to claim 12, wherein the at least one washcoat zone comprises a lateral gradient of washcoat thickness.

15. The diesel engine system according to claim 12, wherein the at least one downstream catalyst zone covers the same part of the filter as the washcoat zone.

16. The diesel engine system according to claim 15, wherein the PGM in the at least one downstream catalyst zone is carried on the particulate refractory oxide in the washcoat.

17. The diesel engine system according claim 12, wherein the particulate refractory oxide is selected from the group consisting of bulk ceria, silica, alumina, titania, zirconia, a mixed oxide or oxides, and a composite oxide of any two or more thereof.

18. The diesel engine system according to claim 1, wherein the first catalyst zone DOC PGM metal and the PGM metal in the at least one downstream catalyst zone is selected from the group consisting of platinum, palladium, rhodium, ruthenium, and mixtures of any two or more thereof.

19. The diesel engine system according to claim 18, wherein a total PGM loading of the PGM metal in the first catalyst zone DOC is from 25 to 200 $g/ft^3$.

20. The diesel engine system according to claim 18, wherein a PGM loading in the at least one downstream catalyst zone is from 0.25 to 120 $g/ft^3$.

21. The diesel engine system according to claim 1, wherein the filter further comprises a catalyst for absorbing $NO_2$ when the exhaust gas is lean.

22. The diesel engine system according to claim 21, wherein the engine management means, in use, intermittently provides a reduced oxygen concentration in the exhaust gas and provides higher temperature exhaust gas relative to normal running conditions for regenerating the $NO_2$ absorbent.

* * * * *